United States Patent Office 3,491,134
Patented Jan. 20, 1970

3,491,134
POLYFLUORINATED ORTHOSILICATES
Christian A. Seil, Santa Monica, Robert H. Boschan, Los Angeles, and James P. Holder, Woodland Hills, Calif., assignors, by mesne assignments, to McDonnell Douglas Corporation, Santa Monica, Calif., a corporation of Maryland
No Drawing. Filed Aug. 3, 1964, Ser. No. 387,168
Int. Cl. C07f 7/04; C10m 3/46
U.S. Cl. 260—448.8    5 Claims

ABSTRACT OF THE DISCLOSURE

Tetrakis - (polyfluoroalkyl) orthosilicates having the formula

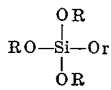

where R has the formula

where $n$ is an integer of 0 to 4, preferably 1 to 3, and X is a member selected from the group consisting of hydrogen and fluorine, and is preferably fluorine, designed particularly for use as base stocks of hydraulic fluids in aircraft systems, and which are also useful as lubricants and as heat transfer or cooling media over a wide temperature range, in aircraft systems.

---

This invention relates to certain polyfluoroalkyl esters of orthosilicic acid, and is particularly concerned with the provision of novel tetrakis-(polyfluoroalkyl) orthosilicates.

It is an object of the present invention to provide a series of compounds having high fire resistance, high temperature stability, and which remain in liquid form over a wide temperature range and are relatively non-volatile at elevated temperatures, and are substantially non-corrosive to metals employed in the construction of component parts such as steel.

Another object of the invention is the provision of polyfluorinated orthosilicates having the above-noted properties and other advantages, and having particular utility as hydraulic fluids, heat transfer fluids, and as lubricants, especially at elevated and reduced temperatures.

Other objects and advantages will appear hereinafter.

We have discovered that the above-noted objects are achieved according to the invention by the provision of a class of tetrakis-(polyfluoroalkyl) orthosilicates having the formula (I)

where R has the formula (II)         $CF_3(CF_2)_nCX_2CH_2CH_2$— where $n$ is an integer of 0 to 4, preferably 1 to 3, and X is a member selected from the group consisting of hydrogen and fluorine, and is preferably fluorine.

The combined fluorine content of the polyfluoroalkyl orthosilicates of the invention can range from about 42% to about 67%, preferably from about 51% to about 66%, by weight. In the compounds noted above, the four alkyl groups of the tetrakis-(polyfluoroalkyl) orthosilicates hereof, defined in Formula II above, can be the same or different.

It has been found that the above-defined tetrakis-(polyfluoroalkyl) orthosilicates are particularly valuable as functional fluids, e.g., as base stocks for hydraulic fluids, and are also useful as heat transfer media and as lubricants due to the advantageous physical properties of such compounds. These properties include high fire resistance, increased temperature stability, and liquidity over a relatively wide temperature range. Thus, for example, generally these fluorinated orthosilicate esters have a thermal stability in the range of about 500° to about 600° F. autoignition temperatures of the order of about 750° to about 900° F., and remain liquid down to a temperature of the order of −75° to −150° F. Further, the viscosity of such polyfluoroalkyl orthosilicates at low temperatures of the order of −75° to −150° F. permit the operative use of such liquids as hydraulic fluids, cooling media and lubricants in these low temperature ranges. These compounds are also relatively non-volatile at elevated temperatures due to the high boiling point of these materials. Also, the orthosilicates of the invention have relatively low pour points, e.g., in the range of about −60° F. to about −150° F., or lower, which, together with the relatively low viscosity of these materials at low temperatures permits the liquid compounds to be pumped readily at low temperatures without high expenditure of energy. Of particular significance, the orthosilicates of the invention have good hydrolytic stability, and do not adversely affect materials, such as metals, e.g., steel, copper, and the like, with which they may be in contact, and which are generally employed in the construction of component parts of hydraulic systems.

The above-noted properties render the tetrakis-(polyfluoroalkyl) orthosilicates hereof particularly useful as hydraulic fluids, lubricants and cooling fluids in aircraft systems, especially modern high-speed aircraft systems.

The tetrakis-(polyfluoroalkyl) orthosilicates of the invention are produced according to one convenient mode of procedure by a transesterification reaction which involves reacting the corresponding polyfluorinated alcohol with a tetraalkyl orthosilicate such as tetraethyl orthosilicate, in a proportion of about 4 moles of the alcohol to one mole of the tetraethyl orthosilicate, preferably in the presence of a minor amount of sodium or sodium alcoholate. The mixture is heated to reflux, distilling off unfluorinated alcohol, e.g., ethanol, which is split off in the reaction, and unreacted polyfluorinated alcohol is removed by distilling at reduced pressure. The remaining mixture is distilled at still lower pressure to recover the desired tetrakis-(polyfluoroalkyl) orthosilicates.

Specific examples of tetrakis-(polyfluoroalkyl) orthosilicates of the invention are as follows:

(1)    $(CF_3CF_2CH_2CH_2O)_4Si$ (2)    $[CF_3(CF_2)_2CH_2CH_2O]_4Si$ (3)    $[CF_3(CF_2)_2CH_2CH_2CH_2O]_4Si$ (4)    $[CF_3(CF_2)_3CH_2CH_2O]_4Si$ (5)    $[CF_3(CF_2)_4CH_2CH_2O]_4Si$ (6)    $[CF_3(CF_2)_3CH_2CH_2CH_2O]_4Si$ (7)    $[CF_3(CF_2)_4CH_2CH_2CH_2O]_4Si$ (8)    $[CF_3(CF_2)_5CH_2CH_2O]_4Si$ (9)    $[CF_3(CF_2)_2CH_2CH_2O]_2Si$
             $[OCH_2CH_2CH_2(CF_2)_2CF_3]_2$

(10)   $[CF_3(CF_2)_2CH_2CH_2O]_2Si$
             $[OCH_2CH_2(CF_2)_3CF_3]_2$

Preferred compounds of the invention are compounds 2 to 6 above.

The following are examples of preparation of the compounds of the invention.

EXAMPLE 1

Tetrakis-(3,3,4,4,5,5,5-heptafluoropentyl) orthosilicate

In a flask is placed 20.8 g. (0.1 mole) of redistilled tetraethyl orthosilicate, 107 g. (0.5 mole) of 3,3,4,4,5,5,5-heptafluoro-1-pentanol and 0.5 g. of sodium.

The mixture is heated to reflux; and ethanol is distilled off through a vacuum-jacketed Vigreaux column.

The unreacted alcohol is removed by distillation at between 15 mm. and 5 mm. mercury pressure. The orthosilicate residue is distilled at 0.2 mm.; the main fraction of orthosilicate, 69.0 g. (78.3% yield) distills at 98°–113° C. (0.2 mm. mercury).

The tetrakis-(polyfluoroalkyl) orthosilicate thus produced, compound (2) above, has a viscosity at 210° F. of 1.28 centistokes and a viscosity at $-65°$ F. of 687 centistokes. The compound has a pour point below $-150°$ F., a density of 1.60 g./ml. at 77° F., and a thermal stability in the range of about 500° F. to about 600° F. Such orthosilicate has a high autoignition temperature, good hydrolytic stability and high fire resistance. Such compound can be employed as a hydraulic fluid or as a heat transfer medium, e.g., as a coolant, in the hydraulic systems of aircraft, for operation at very low temperatures and also at high temperature, and is essentially non-corrosive to metals such as iron, steel and copper.

A comparison of certain important properties of the orthosilicates of Example 1, designated compound A, with a related prior art compound $$(CHF_2CF_2CF_2CF_2CH_2O)_4Si$$

designated compound B, is set forth in the table below:

TABLE

|  | Viscosity (centistokes) | | | Pour Point, ° F. | Autoignition Temperature, ° F. | Density at 77° F., g./ml. |
| --- | --- | --- | --- | --- | --- | --- |
|  | $-65°$ F. | $-60°$ F. | 210° F. |  |  |  |
| Compound A | 687 |  | 1.28 | $<-150$ | 800 | 1.60 |
| Compound B |  | 6,725 | 2.44 | $<-110$ | 735 | 1.74 |

From the table above it is seen that at temperatures as low as $-65°$ F. the viscosity of compound A of the invention is relatively low and is substantially lower, by about ten-fold, than the viscosity of the prior art compound B at even the higher temperature of $-60°$ F., and that compound A has a substantially lower pour point than compound B. Hence, it is clearly seen that compound A of the invention can be employed as a hydraulic fluid or heat transfer medium in hydraulic systems, particularly of aircraft, operating at temperatures of the order of $-150°$ F. or below, and substantially lower than the temperature of operability of compound B. Further, compound A of the invention has a lower density than compound B, thus requiring less weight per unit volume of fluid in a hydraulic system of an aircraft than in the case of compound B, and such reduced density together with the lower viscosity of compound A at lower temperatures and also the lower pour point of compound A, permit the pumping of fluid A at low temperatures with a smaller expenditure of pump energy than fluid B. Further, it is seen that compound A of the invention has a higher autoignition temperature and hence a higher thermal stability than prior art compound B.

EXAMPLE 2

Tetrakis-(3,3,4,4,5,5,6,6,6-nonafluorohexyl) orthosilicate

A mixture of 1.50 moles tetraethyl orthosilicate, 0.35 mole of 3,3,4,4,5,5,6,6,6-nonafluorohexanol and 1 g. of sodium is heated to reflux; ethanol is distilled from the mixture. The unreacted alcohol is removed by distillation at 15 mm. to 5 mm. mercury pressure. The orthosilicate residue is distilled off at lower pressure between about 0.2 and 0.3 mm. mercury.

The tetrakis-(polyfluoroalkyl) orthosilicate thus produced, compound 4 above, has a low viscosity at low temperature, a low pour point, high thermal stability, a high autoignition temperature, good hydrolytic stability and high fire resistance.

The tetrakis-(polyfluoroalkyl) orthosilicate of this example can be employed as a functional fluid, particularly useful as a base stock for hydraulic fluids and as a heat transfer fluid in an aircraft system operating over a wide temperature range of from about $-75°$ F. to about 550° F.

EXAMPLE 3

Tetrakis-(4,4,5,5,6,6,6-heptafluorohexyl) orthosilicate

A mixture of about 0.5 mole of 4,4,5,5,6,6,6-heptafluoro-1-hexanol and about 0.1 mole of tetraethyl orthosilicate in the presence of about 0.5 g. of sodium, is heated to reflux, and ethanol is distilled off.

The unreacted fluorohexanol is removed by distillation at reduced pressure between about 5 mm. and 15 mm. mercury, and the polyfluoroalkyl orthosilicate product residue is distilled off a still lower pressure.

The tetrakis-(polyfluoroalkyl) orthosilicate thus produced, compound 3 above, has a low viscosity at relatively low temperature, a low pour point, high thermal stability, good hydrolytic stability and high fire resistance. Such orthosilicate can serve as a hydraulic fluid in an aircraft system.

EXAMPLE 4

Compounds 5 and 6 are prepared by procedure similar to that described above in Example 1, except employing in each instance the appropriate corresponding fluorinated alcohol.

The resulting tetrakis-(polyfluoroalkyl) orthosilicates thus obtained have properties generally similar to those of compound 2 of Example 1 above.

EXAMPLE 5

A mixture of about 0.25 mole of 3,3,4,4,5,5,5-heptafluoropentanol and 0.25 mole of 4,4,5,5,6,6,6-heptafluoro-1-hexanol and 0.1 mole of tetraethyl orthosilicate in the presence of about 0.5 g. of sodium, is heated to reflux, and ethanol is distilled off.

The unreacted fluorinated alcohols are removed by distillation at reduced pressure between about 5 mm. and 15 mm. mercury, and the product mixture of polyfluoroalkyl orthosilicates is distilled off at about 0.45 mm. pressure.

The orthosilicate product thus produced is composed of a mixture of symmetrical and unsymmetrical polyfluoroalkyl orthosilicates in which the fluoroalkyl substituents on the respective orthosilicates varies, and comprises compounds containing zero, one, two, three and four heptafluoropentyl groups and four, three, two, one and zero heptafluorohexyl groups, respectively. This product mixture has low viscosity at low temperatures, a low pour point, high thermal stability, good hydrolytic stability and high fire resistance. Such orthosilicate product has utility as a hydraulic fluid or as a cooling medium in an aircraft system.

From the foregoing, it is seen that the invention provides a novel class of tetrakis-(polyfluoroalkyl) orthosilicates which are designed particularly for use as base stocks of hydraulic fluids in aircraft systems, and which are also useful as lubricants and as heat transfer or cooling media over a wide temperature range, in aircraft systems, without any significant corrosive effect on metals of construction such as steel used in such systems.

Hexa-(polyfluoroalkyloxy) disiloxanes and tetra-(polyfluoroalkyl) orthosilicates are known in which the alkyl groups are completely fluorinated except for the carbon atom in 1- position, which carries two hydrogen atoms, and the terminal carbon atom, which carries one hydrogen atom and two fluorine atoms, as illustrated by prior art compound B above. As previously noted, the orthosilicates of the invention such as represented by compound A above, have certain important advantages over the prior art compounds such as compound B. Also, the orthosilicates of the invention have improved hydrolytic stability as compared to the above prior art orthosilicates. Further, it has been found that such prior art compounds are seriously corrosive to iron, apparently due to liberation of hydrogen fluoride as result of thermal breakdown between the adjacent —CH$_2$— and —CF$_2$— groups in the 1- and 2- positions, respectively, of the fluoroalkyl groups, and also apparently due to liberation of hydrogen fluoride from the terminal carbon atom.

On the other hand, due to the different structure of the fluoroalkyl groups in the orthosilicates of the present invention, which contain —CH$_2$— groups in both the 1- and 2- positions, and carries a fully fluorinated terminal carbon atom, that is, a terminal CF$_3$ group, the orthosilicates of the invention are thermally stable and resist decomposition to form hydrogen fluoride, and accordingly are substantially non-corrosive to metals such as iron and steel at elevated temperatures.

While we have described particular embodiments of our invention for the purpose of illustration, it should be understood that various modifications and adaptations thereof may be made within the spirit of the invention, as set forth in the appended claims.

We claim:

1. A tetrakis-(polyfluoroalkyl) orthosilicate having the formula $$\text{RO}-\underset{\underset{\text{OR}}{|}}{\overset{\overset{\text{OR}}{|}}{\text{Si}}}-\text{OR}$$

where R has the formula CF$_3$(CF$_2$)$_n$CF$_2$CH$_2$CH$_2$— where $n$ is an integer of from 0 to 4.

2. A compound as defined in claim 1, wherein $n$ is an integer of from 1 to 3.

3. The compound having the formula

[CF$_3$(CF$_2$)$_2$CH$_2$CH$_2$O]$_4$Si

4. The compound having the formula

[CF$_3$(CF$_2$)$_3$CH$_2$CH$_2$O]$_4$Si

5. The compound having the formula

[CF$_3$(CF$_2$)$_4$CH$_2$CH$_2$O]$_4$Si

References Cited

UNITED STATES PATENTS

| | | | |
|---|---|---|---|
| 2,993,925 | 7/1961 | Husted | 260—448.8 |
| 3,033,788 | 5/1962 | Trautman | 260—448.8 X |
| 3,085,104 | 4/1963 | Smith et al. | 260—448.8 |
| 3,223,642 | 12/1965 | Smith et al. | 260—448.8 X |
| 3,246,030 | 4/1966 | Seil et al. | 260—448.8 X |

OTHER REFERENCES

Froberger, J. Org. Chem., 25, February 1960, pp. 311–312. In Group 110.

TOBIAS E. LEVOW, Primary Examiner

P. F. SHAVER, Assistant Examiner

U.S. Cl. X.R.

252—49.6, 78